United States Patent [19]
Maeda

[11] Patent Number: 5,497,481
[45] Date of Patent: Mar. 5, 1996

[54] MICROCOMPUTER COMPUTER SYSTEM HAVING PLURAL PROGRAMMABLE TIMERS AND PREVENTING MEMORY ACCESS OPERATIONS FROM INTERFERING WITH TIMER START REQUESTS

[75] Inventor: Hiroshi Maeda, Atsugi, Japan

[73] Assignee: Ricoh Company, Ltd., Tokyo, Japan

[21] Appl. No.: 275,741

[22] Filed: Jul. 19, 1994

[30] Foreign Application Priority Data

Jul. 21, 1992 [JP] Japan ................................. 5-179665

[51] Int. Cl.⁶ ............................................. G06F 1/04
[52] U.S. Cl. ..................... 395/550; 364/270; 364/270.2; 364/270.3; 364/270.6; 364/DIG. 1
[58] Field of Search ................................. 395/425, 550; 364/270, 270.2, 270.3, 270.6, 242.3, 242.31

[56] References Cited

U.S. PATENT DOCUMENTS

| | | | |
|---|---|---|---|
| 4,688,166 | 8/1987 | Schneider | 364/200 |
| 4,716,523 | 12/1987 | Burrus et al. | 364/200 |
| 4,782,439 | 11/1988 | Borkar et al. | 364/200 |

FOREIGN PATENT DOCUMENTS 76436   6/1980   Japan ................. G06F 3/153

OTHER PUBLICATIONS

Intel Data Sheets, "82C54 CHMOS Programmable Interval Timer", Oct. 1987, pp. 2-46-2-63.

*Primary Examiner*—Kevin A. Kriess
*Assistant Examiner*—Dennis M. Butler
*Attorney, Agent, or Firm*—Popham, Haik, Schnobrich & Kaufman, Ltd.

[57] ABSTRACT

A microcomputer system includes: a plurality of DMA data transfer paths for use with a random access memory, at least one of the data transfer paths being set up by a central processing unit under control of a program stored in a read only memory; a plurality of memory locations of the random access memory assigned to the plurality of DMA data transfer paths respectively, each memory location storing time setting data; a timing signal generating unit for outputting a timing signal at predetermined intervals; a DMA control unit for reading out each time setting value from first memory locations through first DMA data transfer paths respectively in synchronism with the timing signal; a detecting unit for detecting whether the time setting value is equal to zero; a plurality of subtraction registers for decrementing the time setting value by one when the time setting value is detected to be unequal to zero; and a writing unit for writing the decremented time setting value into corresponding one of the first memory locations through corresponding one of the first DMA data transfer paths in conjunction with the DMA control unit.

6 Claims, 3 Drawing Sheets

| CPU PROCESSING CYCLE |||
|---|---|---|
| DATA READ FROM RAM | TIME SETTING DATA | DATA WRITTEN TO RAM |
| "0" | "50" | "0" |

FIG.3

| SEQUENCE No. | 1 | 2 | 3 | 4 | 5 | 6 | 7 | 8 | 9 | 10 | 11 | ... |
|---|---|---|---|---|---|---|---|---|---|---|---|---|
| INTERVAL | 5ms | 5ms | 5ms | 5ms | 5ms | 5ms | 5ms | 5ms | 5ms | 5ms | 5ms | ... |
| TIMERS ACTIVATED — 1ST TIMERS | DMA S1 DMA S2 DMA S3 DMA S4 DMA S5 DMA S6 DMA S7 DMA S8 | DMA S1 DMA S2 DMA S3 DMA S4 DMA S5 DMA S6 DMA S7 DMA S8 | DMA S1 DMA S2 DMA S3 DMA S4 DMA S5 DMA S6 DMA S7 DMA S8 | DMA S1 DMA S2 DMA S3 DMA S4 DMA S5 DMA S6 DMA S7 DMA S8 | DMA S1 DMA S2 DMA S3 DMA S4 DMA S5 DMA S6 DMA S7 DMA S8 | DMA S1 DMA S2 DMA S3 DMA S4 DMA S5 DMA S6 DMA S7 DMA S8 | DMA S1 DMA S2 DMA S3 DMA S4 DMA S5 DMA S6 DMA S7 DMA S8 | DMA S1 DMA S2 DMA S3 DMA S4 DMA S5 DMA S6 DMA S7 DMA S8 | DMA S1 DMA S2 DMA S3 DMA S4 DMA S5 DMA S6 DMA S7 DMA S8 | DMA S1 DMA S2 DMA S3 DMA S4 DMA S5 DMA S6 DMA S7 DMA S8 | DMA S1 DMA S2 DMA S3 DMA S4 DMA S5 DMA S6 DMA S7 DMA S8 | ... |
| 2ND | DMA M1 | DMA M2 | DMA M3 | DMA M4 | DMA M1 | DMA M2 | DMA M3 | DMA M4 | DMA M1 | DMA M2 | DMA M3 | ... |
| 3RD | DMA L1 | DMA L2 | DMA L3 | DMA L4 | DMA L5 | DMA L6 | DMA L7 | DMA L8 | DMA L9 | DMA L10 | DMA L1 | ... |

MICROCOMPUTER COMPUTER SYSTEM HAVING PLURAL PROGRAMMABLE TIMERS AND PREVENTING MEMORY ACCESS OPERATIONS FROM INTERFERING WITH TIMER START REQUESTS

BACKGROUND OF THE INVENTION

The present invention relates to a microcomputer system which has a central processing unit, a read only memory, and a random access memory, and uses a plurality of timers which facilitate monitoring events within the microcomputer system at predetermined intervals.

A programmable timer which operates according to a stored program is used by a microcomputer system to monitor events within the microcomputer system at fixed intervals, the microcomputer system having a CPU (central processing unit), a ROM (read only memory) and a RAM (random access memory). Japanese Laid-Open Patent Application No. 55-76436 discloses a proposed microcomputer system having such a timer. This timer is called also a programmable software timer. In the proposed microcomputer system, the hardware size can be made smaller by using the programmable software timer.

In a conventional microcomputer system having a programmable timer function, an interrupt to the CPU take places at predetermined intervals. Once the CPU receives an interrupt signal, normal operations are temporarily suspended and a timer operation with respect to the programmable timer starts. This timer operation with respect to the programmable timer is performed within each of the intervals in accordance with a program stored in the ROM.

However, it is necessary that a microcomputer system such as a personal facsimile system having a relatively large number of data transfer paths for use with the memory uses a plurality of programmable timers to monitor events within the entire system. If a conventional programmable timer function is applied to such a microcomputer system, the CPU has to carry out the memory read, memory write and detection operations for all of the programmable timers within each of the predetermined intervals. Hence, the CPU processing load in such a case will be heavy, and the speed of the CPU processing of other tasks will become low when the programmable timers are active at the same time.

In addition, it is likely that an error of a timer start request takes place when the CPU has a time delay between the memory read operation and the memory write operation. FIG. 4 shows such an error of the timer start request when it is issued on a conventional microcomputer system. When the CPU receives a timer start request signal, a time setting value "50" is written to a prescribed memory location of the RAM. However, a memory read operation may be performed immediately before the timer start request, and it may be detected that the data read from the RAM is "0". In such a case, the CPU writes the value "0" to the memory location of the RAM as the result of the detection. That is, the time setting value "50" written to the RAM at the issue of the timer start request, is erroneously changed to "0" by the memory write operation. Accordingly, the conventional microcomputer system may suffer such a problem when the CPU has a time delay between the memory read and write and when the memory access operations interfere with the timer start request.

SUMMARY OF THE INVENTION

Accordingly, it is a general object of the present invention to provide an improved microcomputer system in which the above mentioned problem is eliminated.

Another, more specific object of the present invention is to provide a microcomputer system which reduces the CPU processing load with a plurality of programmable timers used in the microcomputer system, so as to increase the speed of the CPU processing of other tasks when the programmable timers are active at the same time.

Still another object of the present invention is to provide a microcomputer system which prevents the memory access operations from interfering with the timer start request to avoid causing the error of the timer start request.

The above mentioned object of the present invention is achieved by a microcomputer system which includes a plurality of direct memory access data transfer paths for use with a random access memory, at least one of the data transfer paths being set up by a central processing unit under control of a program stored in a read only memory; a plurality of memory locations of the random access memory assigned to the plurality of direct memory access data transfer paths respectively, each memory location storing time setting data; a timing signal generating unit for outputting a timing signal at predetermined intervals; a direct memory access control unit for reading out each time setting value from first memory locations of the random access memory through first direct memory access data transfer paths respectively in synchronism with the timing signal output by the timing signal generating unit, the first memory locations and the first direct memory access data transfer paths being set up by the central processing unit; a detecting unit for detecting whether the time setting value, read from each first memory location, is equal to zero; a plurality of subtraction registers for decrementing the time setting value by one when the time setting value is detected to be unequal to zero; and a writing unit for writing the decremented time setting value to corresponding one of the first memory locations of the random access memory through corresponding one of the first direct memory access data transfer paths in conjunction with the direct memory access control unit.

According to the present invention, it is possible to reduce the CPU processing load relating to the monitoring of the events within the microcomputer system. In addition, it is possible to prevent the memory access operations from interfering with the timer start request thereby avoiding the occurrence of an error of the timer start request.

BRIEF DESCRIPTION OF THE DRAWINGS

The above and other objects, features and advantages of the present invention will be more apparent from the following detailed description when read in conjunction with the accompanying drawings in which:

FIG. 3 is a diagram for explaining cyclic direct memory access operations performed by the timers of the microcomputer system.

DESCRIPTION OF THE PREFERRED EMBODIMENTS

A description will now be given, with reference to FIG. 1, of a microcomputer system to which the present invention is applied.

Figures 1, 4:
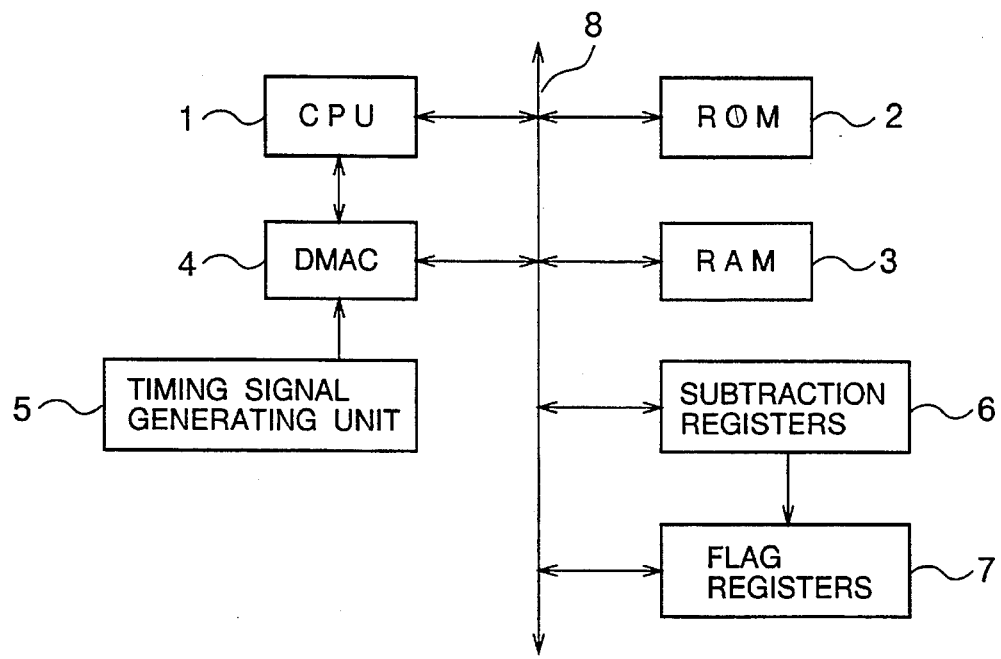
FIG. 1 is a system block diagram showing a microcomputer system to which the present invention is applied.
FIG. 4 is a diagram for explaining an error of a timer start request when it is issued while the memory access operation is performed on a conventional microcomputer system.

In FIG. 1, the microcomputer system includes a CPU (central processing unit) 1, a ROM (read only memory) 2, a RAM (random access memory) 3, a DMAC (direct memory access controller) 4, a plurality of subtraction registers 6, and a plurality of flag registers 7, and these component units are interconnected by a system bus 8. The DMAC 4 is coupled to a timing signal generating unit 5. The subtraction registers 6 are respectively coupled to the plurality of flag registers 7.

The CPU 1 controls the operation of the entire microcomputer system in accordance with a program stored in the ROM 2. The read only memory 2 stores the program, and the instructions of the program cannot be altered in normal operation of the microcomputer system. The RAM 3 is a temporary data storage device for use in the microcomputer system, and data is readable from and writable to the RAM 3 by the CPU 1 via the system bus 8. Alternatively, data is directly readable from and writable to the RAM 3 by the DMAC 4 via the system bus 8 without passing it through the CPU 1.

The DMAC 4 is a direct memory access control device which receives an instruction from the CPU 1 and controls DMA (direct memory access) data transfer between the RAM 3 and another device without passing the data signal through the CPU 1. Upon receipt of the instruction from the CPU 1, the DMAC 4 generates a DMA read or write signal to the RAM 3 and a memory address signal for specifying a memory location of the RAM 3 relating to the DMA read/write. The timing signal generating unit 5 outputs a timing signal at fixed intervals predetermined by hardware. The DMAC 4 reads out data from a specified memory location of the RAM 3 in synchronism with the timing signal output by the timing signal generating unit 5.

The microcomputer system according to the present invention includes a plurality of DMA data transfer paths for use with the RAM 3, and at least one of the data transfer paths is set up by the CPU 1 under control of the program stored in the ROM 2. The microcomputer system according to the present invention includes a plurality of memory locations of the RAM 3, and the memory locations are assigned to the DMA data transfer paths respectively. Each of the memory locations of the RAM 3 stores time setting data for use with one of a plurality of programmable timers.

The CPU 1 sets up first memory locations among the memory locations of the RAM 3, and sets up first DMA data transfer paths among the DMA data transfer paths of the RAM 3. The first memory locations and the first DMA data transfer paths are related to the DMA read/write operations by the DMAC 4. Setting up the first memory locations and the first DMA data transfer paths is made in accordance with a number of the intervals corresponding to a number of timing signals which has been output by the timing signal generating unit 5.

The CPU 1 detects whether the time setting value, read from each first memory location, is equal to zero. The subtraction registers 6 each decrement the time setting value by one to produce a decremented time setting value when the time setting value is detected to be unequal to zero. The DMAC 4 writes the decremented time setting value from any of the subtraction registers 6 into corresponding one of the first memory locations of the RAM 3 through corresponding one of the first DMA data transfer paths.

The DMAC 4 counts timing signals which have been output by the timing signal generating unit 5 to determine a total time corresponding to a number of the predetermined intervals. In the microcomputer system according to the present invention, the memory locations of the RAM 3 and the DMA data transfer paths, which are used for the DMA read/write, are predetermined by the CPU 1 in accordance with the total time.

The DMAC 4 inhibits any of the subtraction registers 6 from decrementing the time setting value by one when the time setting value is detected to be equal to zero, and inhibits the writing of the decremented time setting value to the RAM 3 when the time setting value is detected to be equal to zero.

In the microcomputer system according to the present invention, the memory reading and detection of the DMAC 4, the decrementing of the subtraction registers 6, and the memory writing of the DMAC 4 are sequentially carried out within each of the intervals. The operations of these units are repeated until the time setting value reaches zero.

The flag registers 7 have a plurality of flags corresponding to the subtraction registers 6. Each of the flags indicate whether a time setting value stored in corresponding one of the first memory locations of the RAM 3 is equal to zero. Each of the flags is set to an active state when the time setting value is detected to be zero.

The CPU 1 detects a time-out state of each of the timers by sensing an active state of corresponding one of the flags of the flag registers 7, and the flags of the flag registers 7 are set by the CPU 1 according to the time setting value read from the RAM 3. That is, when one of the flags of the flag registers 7 is set to the active state (that is "1"), the CPU 1 detects that the timer corresponding to that flag is in the time-out state.

Next, a description will be given of a monitoring procedure performed by the microcomputer system according to the present invention. For the sake of convenience, in the following description, it will be assumed that the timing signal generating unit 5 outputs a timing signal at time intervals of 5 ms (milliseconds), and that the microcomputer system has eight first timers S1 through S8 each with a first DMA interval of 5 ms, four second timers M1 through M4 each with a second DMA interval of 20 ms (which is 4 times as long as 5 ms), and ten third timers L1 through L10 each with a third DMA interval of 50 ms (which is 10 times as long as 5 ms). Also, it will be assumed that a data signal, indicating a time setting value in each DMA data transfer path within the microcomputer system, is comprised of eight bits, the data signal being described by decimal values. Thus, the data signal in each DMA data transfer path indicates one of decimal values ranging from zero to 255. The time setting value for each timer is stored in a memory location of the RAM 3.

Since the timing signal is output at every 5 ms, the first timers having the first DMA interval "5 ms" can be used to monitor events at a maximum monitoring interval of 1275 ms (which is 255 times as long as 5 ms), the second timers having the second DMA interval "20 ms" can be used to monitor events at a maximum monitoring interval of 5100 ms (which is 255 times as long as 20 ms), and the third timers having the third DMA interval "50 ms" can be used to monitor events at a maximum monitoring interval of 12.75 s (which is 255 times as long as 50 ms).

Figure 2:
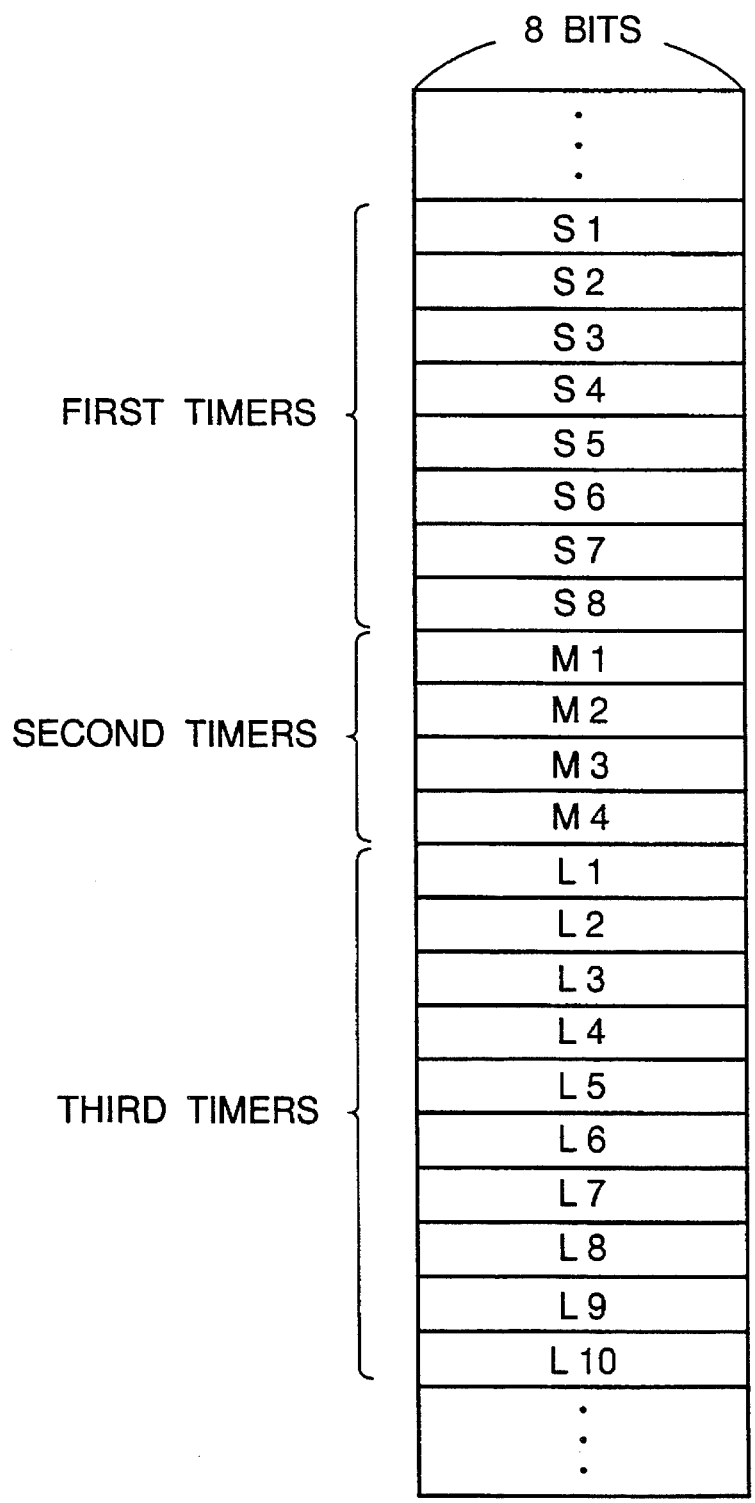
FIG. 2 is a diagram showing memory locations of a random access memory of the microcomputer system in FIG. 1 which are assigned as storage portions of time setting data of various timers.

FIG. 2 shows memory locations of the RAM 3 of the microcomputer system in FIG. 1 which are assigned as storage portions of time setting data of the timers described above. In FIG. 2, twenty two memory locations of the RAM 3, each memory location consisting of one byte (that is 8 bits), are assigned as storage portions for time setting data of the first timers S1 through S8, the second timers M1 through M4 and the third timers L1 through L10, respectively. A time setting value, described by the 8-bit data signal of each timer, is stored in one of these memory locations of the RAM 3.

FIG. 3 shows cyclic direct memory access operations performed by the timers of the microcomputer system. When the timers start operating, DMA (direct memory access) operations are performed at fixed intervals of 5 ms. The first timers S1–S8 perform the DMA operations at the first DMA interval "5 ms" which is the same as the interval of the timing signal. The second timers M1–M4 perform the DMA operations at the second DMA interval "20 ms" in a cyclic manner. That is, one of the second timers performs the DMA operations at every 5 ms and different second timers sequentially perform the DMA operations one after another within the second DMA interval "20 ms". The third timers L1–L10 perform the DMA operations at the third DMA interval "50 ms" in a cyclic manner. That is, one of the third timers performs the DMA operations at every 5 ms and different third timers sequentially perform the DMA operations one after another within the third DMA interval "50 ms".

In FIG. 3, the second timer M1, for example, is intermittently activated at the second DMA interval "20 ms", that is, at the first interval "1", at the fifth interval "5", . . . . The third timer L1, for example, is intermittently activated at the third DMA interval "50 ms" that is at the first interval "1" at the eleventh interval "11", . . . . Each of the first timers S1–S8 are activated at every interval.

The microcomputer system according to the present invention carries out a set of DMA data transfer, decrementing and detecting operations at each of the intervals "5 ms" by making use of the plurality of timers described above. More specifically, the DMAC 4 reads out each time setting value from the first memory locations of the RAM 3 through the first DMA data transfer paths respectively in synchronism with the timing signal output by the timing signal generating unit 5. The first memory locations and the first DMA data transfer paths are set up by the CPU 1. The CPU detects whether the time setting value, read from each first memory location of the RAM 3, is equal to zero.

When the time setting value, read from the RAM 3, is detected to be unequal to zero, the CPU 1 allows corresponding one of the subtraction registers 6 to decrement the time setting value by one. The DMAC 4 writes the decremented time setting value from the subtraction register into corresponding one of the first memory locations of the RAM 3 through the system bus 8.

On the other hand, when the time setting value, read from the RAM 3, is detected to be zero, the CPU 1 inhibits corresponding one of the subtraction registers 6 from decrementing the time setting value, and inhibits the DMAC 4 from writing the time setting value into corresponding one of the first memory locations of the RAM 3 through the system bus 8. The CPU 1 allows corresponding one of the flags of the flag registers 7 to be set to "1".

Accordingly, in a case where it is desired to use a timer having a monitoring interval 30 ms within the microcomputer system, it is possible to use one of the first timers S1–S8 described above. In such a case, a time setting value "6" is preset to one of the memory locations of the RAM 3 corresponding to that first timer. The CPU 1 can detect the end of the monitoring interval "30 ms" of that first timer by detecting a corresponding flag of the flag registers 7 which is set to "1". Since the timing signal is output at the predetermined intervals, the time at which the corresponding flag of the flag registers 7 which is set to "1" is detected may be 25 or 30 ms later from the start of setting the time setting value "6" to the corresponding memory location of the RAM 3.

As described in the foregoing, the microcomputer system according to the present invention can use a plurality of timers at the same time to monitor events within the microcomputer system, and therefore it is possible to reduce the CPU processing load relating to the monitoring of the events even when the micrcomputer system has many data transfer paths with the random access memory. In addition, the CPU has no time delay between the memory read and the memory write at each of the intervals of the timing signals, and therefore it is possible to prevent the memory access operations from interfering with the timer start request, thereby avoiding the occurrence of an error of the timer start request as shown in FIG. 4.

Further, the present invention is not limited to the above described embodiments, and various variations and modifications may be made without departing from the scope of the present invention.

What is claimed is:

1. A microcomputer system having a central processing unit (CPU) operating under control of a program stored in a read only memory (ROM), the system comprising:

a) a random access memory (RAM) having a plurality of RAM memory locations for storing respective time setting values;

b) timing signal generating means for providing a timing signal at predetermined intervals;

c) the CPU, including:
  1) means for setting initial values into first RAM memory locations; and
  2) means for detecting whether time setting values read from the RAM memory locations are equal to zero;

d) subtraction register means, including a plurality of registers corresponding to the plurality of RAM memory locations, each register for decrementing a respective time setting value by one if the CPU detects the time setting value from the RAM memory location to be unequal to zero, to provide a decremented time setting value; and e) direct memory access (DMA) control means including:
  1) means for reading out time setting values from the RAM memory locations in synchrony with the timing signal; and
  2) means for writing any decremented time setting value from the substraction register means into a corresponding first RAM memory location.

2. A microcomputer system according to claim 7, further comprising counting means for counting timing signals which have been output by said timing signal generating means, to determine a total time corresponding to a number of the predetermined intervals, wherein the initial values set up by the central processing unit, are predetermined in accordance with the total time.

3. A microcomputer system according to claim 1, further comprising means for inhibiting said subtraction register means from decrementing the time setting value when the time setting value is detected to be equal to zero, and for inhibiting said writing means from writing the decremented time setting value to the random access memory when the time setting value is detected to be equal to zero.

4. A microcomputer system according to claim 1, wherein said reading of said direct memory access control means, said detecting of said detecting means, said decrementing of said subtraction register means, and said writing of said writing means are sequentially carried out within each of the predetermined intervals when the time setting value is detected to be unequal to zero.

5. A microcomputer system according to claim 7, further comprising flag register means having a plurality of flags corresponding to the plurality of memory locations of the random access memory, each of the flags indicating whether a time setting value stored in corresponding one of the memory locations is equal to zero, wherein each of the flags is set to an active state when said time setting value is detected to be equal to zero.

6. A microcomputer system according to claim 5, wherein the central operating unit detects a time-out state of one of a plurality of programmable timers by sensing an active state of corresponding one of the flags of said flag register means.

* * * * *